July 25, 1967 J. N. SHEETZ 3,333,213
VOLTAGE CONTROLLED VARIABLE FREQUENCY OSCILLATOR HAVING MEANS FOR INSURING PROPER STARTING OF OSCILLATIONS
Filed Nov. 27, 1964
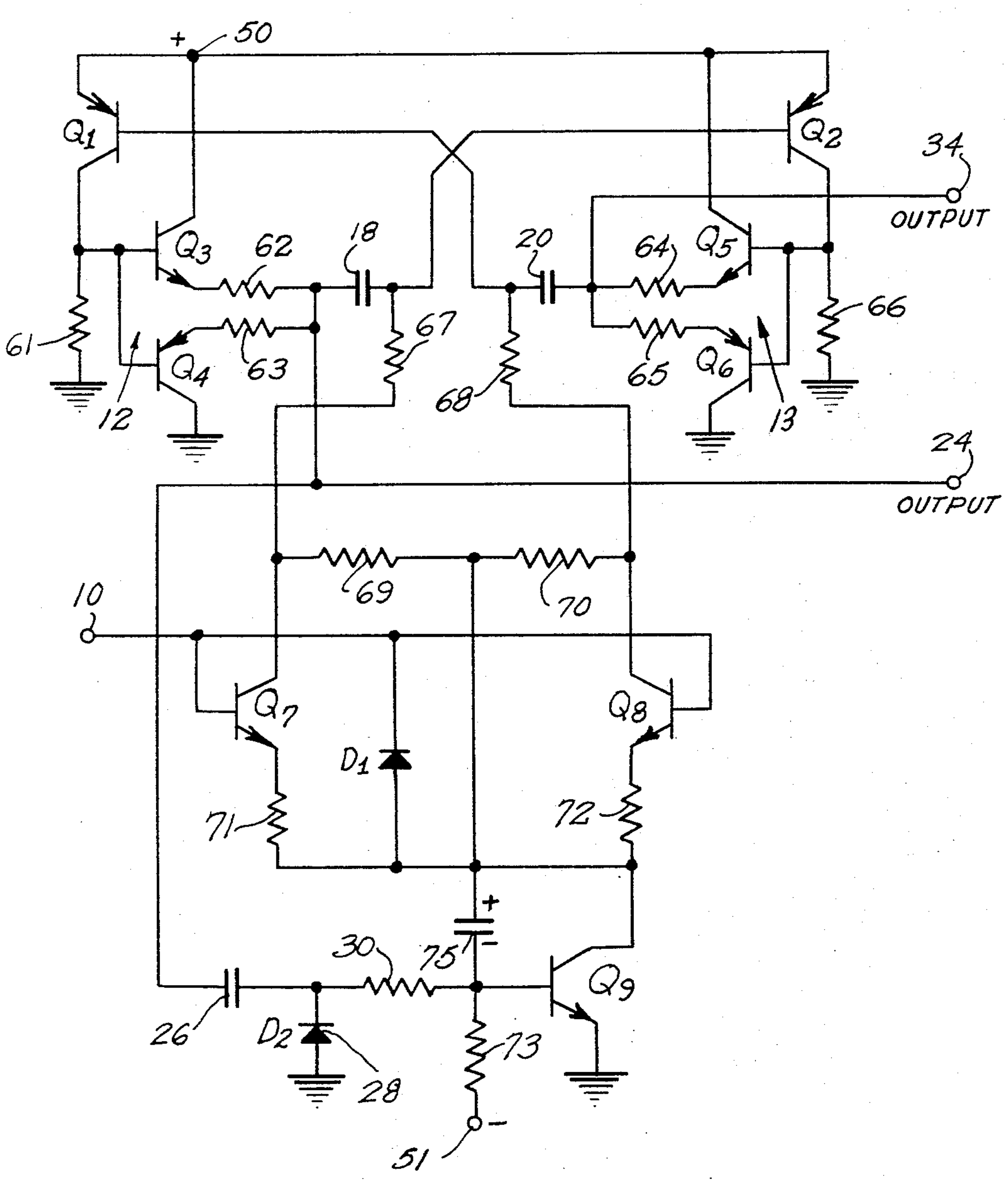
INVENTOR.
James Nelson Sheetz
BY Hill, Sherman, Meroni, Gross & Simpson
ATTORNEYS United States Patent Office 3,333,213

Patented July 25, 1967

3,333,213

VOLTAGE CONTROLLED VARIABLE FREQUENCY OSCILLATOR HAVING MEANS FOR INSURING PROPER STARTING OF OSCILLATIONS

James Nelson Sheetz, Bremen, Ind., assignor, by mesne assignments, to The Bunker-Ramo Corporation, Stamford, Conn., a corporation of Delaware Filed Nov. 27, 1964, Ser. No. 414,253
9 Claims. (Cl. 332—14)

This invention relates to an oscillator system wherein the output frequency is variable over a wide range in accordance with an input signal, and particularly relates to a single, wide-range frequency source to be used for the control of feedrate in a numerical control system for machine tools and the like.

A prior art feedrate control system is illustrated in Hallmark U.S. Patent No. 3,109,974, issued Nov. 5, 1963. The numerical control system of this patent makes use of a fixed frequency oscillator and a variable frequency oscillator so as to provide a wide range of output frequencies for the purpose of feedrate control.

It is an object of the present invention to provide a single, wide-range frequency source suitable for use for the control of feedrate in a numerical control system for machine tools or the like.

It is a further object of the present invention to provide a single frequency source whose output frequency may be varied over a range of frequencies wherein the ratio of the upper frequency to the lower frequency is of the order of 100:1.

A further object of the invention resides in the provision of means for insuring the starting of a wide-range frequency source over a relatively wide frequency range.

Still another object of the invention resides in the provision of a single wide-range frequency source which avoids problems such as zero locking and passing through zero-beat and which is relatively simple to adjust as compared with a beat frequency method of pulse generation.

Yet another object of the invention is to provide a single, wide-range frequency source adapted for use in the control of feedrate in a numerical control system wherein even at low frequencies the pulses are very evenly spaced.

Other objects, features and advantages of the invention will be apparent from the following detailed description taken in connection with the accompanying drawing, in which:

The single figure shows an exemplary preferred circuit in accordance with the present invention.

In a numerical control system for machine tools such as illustrated in the aforementioned Hallmark Patent No. 3,109,974 variations in the feedrate and control of acceleration and deceleration may be carried out by means of a variable frequency pulse source which may be controlled by an analog input voltage. The circuit shown herein by way of example may be substituted for the fixed frequency and variable frequency oscillator of said Hallmark patent, and in this connection the disclosure of the Hallmark patent is incorporated herein by reference for the purpose of disclosing the overall numerical control system.

The analog feedrate control voltage is supplied to terminal 10 in the illustrated circuit.

In the illustrated circuit, transistors Q1 and Q2 are connected to provide a free-running multivibrator circuit with additional current gain being provided by complemented emitter follower circuits 12 and 13 connected with the collectors of the transistors Q1 and Q2, respectively. The circuit 12 comprising transistors Q3 and Q4 and the circuit 13 comprising transistors Q5 and Q6 are required to maintain oscillation of the multivibrator circuit at the higher frequencies.

Associated with the control terminal 10 is a pair of NPN silicon transistors Q7 and Q8 which constitute voltage controlled current sources in circuit with the base capacitors 18 and 20 which form parts of respective capacitance charging circuits or capacitance timing circuits of the multivibrator. The amount of current provided by the transistors Q7 and Q8 determines the time required for transistors Q1 and Q2 to come back into conduction after being turned off on the previous half-cycle.

The illustrated circuit has a single transistor Q9 for insuring the proper starting of oscillation. This transistor, which in the illustrated circuit is a standard NPN type, is in the emitter circuit of the two transistors Q7 and Q8 which control the oscillation frequency of the multivibrator circuit. The total emitter current of transistors Q7 and Q8 must flow in the collector of transistor Q9. Transistor Q9 is normally forward biased into saturation by the rectified output of the multivibrator associated with output terminal 24. The output waveform is coupled to the base of transistor Q9 by means of a circuit including a capacitor 26, a diode 28 and a resistor 30. The forward bias at the base of transistor Q9 exists only as long as the oscillations continue. If the oscillations cease or fail to start upon the application of power the starting transistor Q9 becomes back biased, cutting off its collector current and allowing transistors Q7 and Q8 to also be cut off. This permits transistors Q1 and Q2 to come out of saturation so that oscillation can begin. The problem of starting is most prevalent when the frequency of oscillation is high. Thus, if power is applied to the control terminal 10 with the DC control voltage high (for the upper end of the frequency range) the possibility exists that the current supplied by transistors Q7 and Q8 will be great enough to cause saturation of transistors Q1 and Q2. Under these conditions oscillations cannot begin because the loop gain of the circuit is less than unity. With no oscillation there will be no output at either output terminal 24 or output terminal 34. Diode 28 then will not provide a current to the base of transistor Q9 permitting this transistor to become cut off. This in turn allows oscillation to begin as previously described. The diode 28 will then provide an output which will forward bias transistor Q9 and allow the frequency control transistors Q7 and Q8 to take control. The frequency will then go to its normal value as determined by the DC control voltage at control terminal 10.

By way of example, for the specific numerical control system illustrated in said Hallmark Patent 3,109,974, the illustrated oscillator system may supply frequencies over a range of approximately 1.8 kilocycles per second to 200 kilocycles per second. In fact, the illustrated circuit will operate properly until about 250 kilocycles per second. Above 250 kilocycles per second the specific circuit illustrated will stop with both transistors Q1 and Q2 saturated. The starting circuit will attempt to restart the oscillator and will continue attempts to restart until the control voltage is reduced to a point where the frequency is low enough that the oscillator can sustain itself. A charging circuit for capacitor 18 extends from positive power supply terminal 50 through transistor Q3, resistor 62, capacitor 18, resistor 67, transistor Q7, resistor 71 and transistor Q9. A charging circuit for the capacitor 20 extends from the positive power supply terminal 50 through transistor Q5, resistor 64, capacitor 20, resistor 68, transistor Q8, resistor 72 and transistor Q9. The terminal 50 may be termed means for connecting a source of electrical potential with the respective charging circuits under the control of transistors Q7 and Q8, respectively, for supplying current to the respective charging circuits. When transistor Q1 is conducting, transistor Q3 is forward biased to enable charging of capacitor 18. When transistor Q2 is conducting, transistor Q5 is forward biased, enabling charging of capacitor 20. When transistor Q1 is cut off, transistor Q4 is forward biased, providing a discharge path for capacitor 18. Similarly, when transistor Q2 is cut off, transistor Q6 is forward biased, providing a discharge path for capacitor 20. The term complemented emitter follower circuit as utilized with respect to transistors Q3 and Q4, or with respect to transistors Q5 and Q6, is based on the utilization of this term in the "Handbook of Semiconductor Electronics" edited by Hunter, 1956, FIGURE 15.50 at page 15–51.

By way of specific illustration and not by way of limitation, the parameters for the illustrated circuit may be as follows: positive power supply terminal 50, plus 20 volts, minus power supply terminal 51, minus 20 volts, resistor 30, 22,000 ohms, resistors 61–73 having values, respectively, of 3300 ohms, 100 ohms, 100 ohms, 100 ohms, 100 ohms, 3300 ohms, 1000 ohms, 1000 ohms, 300,000 ohms, 300,000 ohms, 1000 ohms, 100 ohms and 150,000 ohms. For the range of oscillations frequencies mentioned, capacitors 18 and 20 may each have a value of 1500 micromicrofarads (1500 picofarads). Capacitor 26 may have a value of .05 microfarad and capacitor 75 may have a value of 10 microfarad with a rating of 25 volts.

It is, of course, possibe by changing the value of the capacitors 18 and 20 to operate the circuit in any other frequency range desired. For example, with 0.5 microfarad capacitors in the oscillator, the frequency range is from about 5.4 cycles per second to approximately 550 cycles per second. The rise time is still 0.1 microsecond at each of the outputs as with the circuit parameters specifically described above having the frequency range from 1.7 to over 200 kilocycles per second. The fall time is approximately 200 microseconds as compared to a fall time of one microsecond for the circuit parameters specifically given above. The ranges given are for a DC control voltage range from 0 to 10 volts input.

Any other 100:1 range can be chosen by simply changing the value of the feedback capacitors 18 and 20. It appears that with the larger value capacitors the oscillator becomes easier to start. It is possible that the starting circuit can be omitted and the transistors Q7 and Q8 grounded directly.

The circuit of the present invention has advantages of simplicity and ease of adjustments as compared to the beat frequency method of generating feedrate pulses. Problems which occur when two oscillators are used such as zero locking and passing through zero-beat cannot occur with the present circuit. At low frequencies with the present circuit the pulses are very evenly spaced.

It will be apparent that many modifications and variations may be effected without departing from the scope of the novel concepts of the present invention.

I claim as my invention:

1. An oscillator system comprising:

a pair of semiconductor amplifier devices connected in a multivibrator circuit and having first and second capacitance charging current flow paths, the rate of current flow along which controls the frequency of operation of said circuit, first and second current flow control means for controlling curent flow in said first and second capacitance charging current flow paths in accordance with an input control signal, and a semiconductor starting control amplifier device having its output circuit in series with both of said capacitance charging current flow paths and having input circuit means coupled to the output of said multivibrator circuit and responsive to the presence of an output signal for maintaining said starting control amplifier device output circuit in a conducting condition during operation of said multivibrator circuit but responsive to a lack of output from said multivibrator circuit to constrict current flow in said capacitance charging current flow paths.

2. An oscillator system comprising:

multivibrator means having a variable duty cycle dependent upon the value of electric current supplied to at least one capacitance timing circuit thereof, current control translating means having an output circuit connected with said timing circuit and having an input control circuit for controlling current flow in said output circuit, means for connecting a source of electric potential with said timing circuit of said multivibrator, and means for supplying an analog control potential to said input control circuit of said translating means for varying the duty cycle of said multivibrator means in accordance with said analog control voltage, wherein the improvement comprises a semiconductor starting control amplifier device having at least a base electrode, an emitter electrode and a collector electrode, the collector and emitter electrodes providing an output circuit in series with the output circuit of said current control translating means, and rectifier means connected to the output of said multivibrator means and to the base electrode of said starting control amplifier device for supplying a forward biasing signal to said starting control amplifier device in response to operation of said multivibrator means but responsive to a lack of output from said multivibrator means to constrict current flow between the collector and emitter electrodes of said starting control amplifier device.

3. A voltage-controlled oscillator system comprising first and second semi-conducting translating devices each having a base electrode, an emitter electrode, and a collector electrode, at least one of said collector electrodes having an output circuit coupled therewith, first and second timing capacitors each interconnecting the collector electrode of a respective one of said first and second translating devices with the base electrode of the other of said first and second translating devices so as to effect multivibrator action therewith, third and fourth semi-conducting translating devices each having a base electrode, an emitter electrode, and a collector electrode, first and second timing circuits controlling the rate of said multivibrator action to control the frequency of an output signal at said output circuit, said first timing circuit including said first capacitor and said third translating device, and said second timing circuit including said second capacitor and said fourth translating device, input means connected to each of said third and fourth translating devices for supplying an analog control potential thereto to control the rate of charge flow in said first and second timing circuits and thereby to control the frequency of said output signal in accordance with the value of said analog control potential, said first and second timing circuits having a starting control current translating device therein for switching between a conducting condition allowing charge flow in said timing circuits and a conduction inhibiting condition constricting current flow in said timing circuits, the constriction of current flow in both said timing circuits enabling the starting of multivibrator action even with a relatively high value of analog control potential applied by said input means, and starting circuit means coupled to said output circuit and controlling said starting control current translating device and responsive to an output signal at said output circuit to place said starting control current translating device in said conducting condition and responsive to the absence of an output signal at said output circuit to place said starting control current translating device in said conduction inhibiting condition, thereby to enable starting of said multivibrator action even with such relatively high value of analog control potential.

4. The voltage-controlled oscillator system of claim 3 with said starting circuit means comprising a diode coupled to said output circuit to develop a rectified potential in response to the presence of an output signal, said starting control current translating device having an input circuit coupled to said diode for placing said starting control current translating device in said conducting condition in response to the presence of said rectified potential.

5. The oscillator system of claim 3 with said input means receiving analog control potentials continuously variable over a substantial voltage range and said oscillator system being operable over a frequency range having a ratio between upper and lower frequency limits at least about 100 to 1 and having an upper frequency of the order of 200 kilocycles per second.

6. In a voltage-controlled oscillator system comprising first, second, third, fourth, fifth and sixth transistors, each having a base electrode, an emitter electrode, and a collector electrode, the emitter electrodes of the first and second transistors being connected to a common circuit point, the collector electrode of the first transistor being connected to the base electrodes of the third and fourth transistors, the collector electrode of the second transistor being connected to the base electrodes of the fifth and sixth transistors, the collector electrodes of the third and fifth transistors being connected to the common circuit point, the third and fifth transistors being of one of the N-P-N and P-N-P types and the fourth and sixth transistors being of the opposite of said types, the emitter electrodes of the third and fourth transistors being connected to a first output point and the emitters of the fifth and sixth transistors being connected to a second output point, a first timing capacitor connected between the first output point and the base electrode of the second transistor, a second timing capacitor connected between the second output point and the base electrode of the first transistor, and an energy source having one terminal connected to said common circuit point and having an opposite terminal connected with the collector electrodes of said first, second, fourth and sixth transistors, seventh, eighth and ninth transistors, each having a base electrode, an emitter electrode, and a collector electrode, the collector electrode of the seventh transistor being coupled to a circuit point between the first capacitor and the base electrode of the second transistor, and the collector of the eighth transistor being coupled to a circuit point between the base electrode of the first transistor and the second capacitor, the emitter electrodes of the seventh and eighth transistors being connected with the collector electrode of the ninth transistor, and the emitter electrode of the ninth transistor being connected to the opposite terminal of said energy source to provide a first timing circuit extending from the common circuit point through the third transistor, the first capacitor and the seventh transistor and through the ninth transistor, and to provide a second timing circuit extending from the common circuit point through the fifth transistor, the second capacitor, the eighth transistor and through said ninth transistor, and input means connected to the base electrodes of said seventh and eighth transistors for supplying a continuously variable analog control potential thereto to continuously vary the rate of charge flow in said first and second timing circuits and thereby to control the rate of multivibrator action in accordance with said analog control potential.

7. The oscillator system of claim 6 with said input means supplying an analog control potential variable over a range of at least about 10 volts and said oscillator system being operable at any frequency within a frequency range having an upper frequency limit of the order of 100 kilocycles per second and with a ratio between the upper frequency limit and the lower frequency limit at least of the order of 100 to 1.

8. The oscillator system of claim 6 with said ninth transistor having an input circuit connected with the base electrode thereof for switching said ninth transistor between a conducting and a nonconducting condition, said input circuit being connected to the first output point and being responsive to multivibrator action to generate a forward bias voltage at said base electrode of said ninth transistor, and means for reverse biasing said base electrode of said ninth transistor relative to the emitter electrode thereof in response to saturation of the first and second transistors where such saturation prevents multivibrator action.

9. An oscillator system comprising:

a pair of semiconductor amplifier devices connected in a multivibrator circuit and having first and second capacitance timing current flow paths, the rate of current flow along which controls the frequency of operation of said circuit, first and second current flow control means for controlling current flow in said first and second capacitance timing current flow paths in accordance with an input control signal, and wherein the improvement comprises a semiconductor starting control amplifier device having its output circuit in series with both of said capacitance timing current flow paths and having input circuit means coupled to the output of said multivibrator circuit and responsive to the presence of an output signal for maintaining said starting control amplifier device output circuit in a conducting condition during operation of said multivibrator circuit but responsive to a lack of output from said multivibrator circuit to constrict current flow in said capacitance timing current flow paths.

References Cited

UNITED STATES PATENTS

| | | | |
|---|---|---|---|
| 2,968,008 | 1/1961 | Marenholtz | 331—113 |
| 3,133,257 | 5/1964 | Palmer et al. | 331—113 |
| 3,167,726 | 1/1965 | Foerster | 332—14 X |
| 3,204,200 | 8/1965 | White | 332—14 |
| 3,238,471 | 3/1966 | Wessels | 332—14 |

OTHER REFERENCES

Biddlecomb: "Latest Multivibrator Improvement," Electronics, April 26, 1963, pages 64, 65.

Dakin: "Novel Multivibrators Test Tape Transports," Electronics, February 14, 1964, pages 40–43.

"Wide-Range Multivibrator Varies Frequency From 8 kc. to 3 mc.," Electronic Design, April 1964, page 50.

ROY LAKE, *Primary Examiner.*

J. B. MULLINS, *Assistant Examiner.*